(12) United States Patent
McDonald et al.

(10) Patent No.: US 10,247,175 B2
(45) Date of Patent: Apr. 2, 2019

(54) WAX-MOTOR WITH HIGH CYCLE LIFE

(71) Applicant: ILLINOIS TOOL WORKS INC., Glenview, IL (US)

(72) Inventors: Randy S. McDonald, Sussex, WI (US); Brian A. Stelloh, Franklin, WI (US)

(73) Assignee: Illinois Tool Works Inc., Glenview, IL (US)

( * ) Notice: Subject to any disclaimer, the term of this patent is extended or adjusted under 35 U.S.C. 154(b) by 426 days.

(21) Appl. No.: 14/786,232

(22) PCT Filed: Mar. 27, 2014

(86) PCT No.: PCT/US2014/032070
§ 371 (c)(1),
(2) Date: Oct. 22, 2015

(87) PCT Pub. No.: WO2014/178969
PCT Pub. Date: Nov. 6, 2014

(65) Prior Publication Data
US 2016/0069330 A1 Mar. 10, 2016

Related U.S. Application Data

(60) Provisional application No. 61/816,892, filed on Apr. 29, 2013.

(51) Int. Cl.
*F03G 7/06* (2006.01)
*F16J 15/18* (2006.01)
(52) U.S. Cl.
CPC ............... *F03G 7/06* (2013.01); *F16J 15/18* (2013.01)

(58) Field of Classification Search
CPC ..... F03G 7/06; B29C 33/005; B29C 45/2616; B29C 2045/0034
See application file for complete search history.

(56) References Cited

U.S. PATENT DOCUMENTS

| 3,075,348 A | 1/1963 | Baker |
| 3,336,745 A | 8/1967 | Schwartz |
| 4,043,727 A | 8/1977 | Henzl |
| 4,207,767 A | 6/1980 | Schmucki |
| 4,441,317 A | 4/1984 | Wolfe et al. |
| 4,691,516 A | 9/1987 | Fornasari |
| 5,177,963 A | 1/1993 | Kuze |
| 5,572,869 A | 11/1996 | Schantz et al. |
| 2010/0293939 A1 | 11/2010 | Onishi |

FOREIGN PATENT DOCUMENTS

| EP | 0476494 A1 | 3/1992 |
| FR | 1333970 A | 8/1963 |
| GB | 1143078 A | 2/1969 |

OTHER PUBLICATIONS

ISR and WO for PCT/US2014/032070 dated Dec. 22, 2014.

*Primary Examiner* — Jonathan Matthias
(74) *Attorney, Agent, or Firm* — Boyle Fredrickson, SC (57) ABSTRACT

A seal assembly for a wax motor or the like provides an elastomeric seal, fitting against an actuator shaft that may slide through the elastomeric seal, where the elastomeric seal has mold flash regions that are displaced from the contact area between the shaft and the elastomeric seal significantly increasing elastomeric seal life.

16 Claims, 5 Drawing Sheets

WAX-MOTOR WITH HIGH CYCLE LIFE

CROSS REFERENCE TO RELATED APPLICATIONS

This application in a National Phase Application of International Application No. PCT/US2014/032070 filed Mar. 27, 2014, and claims the benefit of U.S. provisional application 61/816,892 filed Apr. 29, 2013 and hereby incorporated by reference.

FIELD OF THE INVENTION

The present invention relates to wax motors used to provide mechanical actuation in response to heating, and specifically to a wax motor having an extended life.

BACKGROUND OF THE INVENTION

Wax motors provide a simple and reliable linear actuator used in a variety of applications including home appliances. Typically, a wax motor provides a metal housing holding wax and a piston so that expansion of the wax drives the piston outward. The expansion of wax occurs when the housing is heated, for example, by electrical resistance such as a positive temperature coefficient thermistor. Typically, a return spring is present in the mechanism associated with the wax motor to return the piston into the housing when the wax cools. Such wax motors develop large forces over a short stroke distance such as one-quarter inch and may be operated for many heating and cooling cycles.

The design and construction of a wax motor is described in U.S. Pat. No. 5,572,869 assigned to the assignee of the present invention and hereby incorporated by reference.

The wax motor piston may be a smooth cylindrical rod passing out of the housing through a seal that retains the wax in the housing. A common seal includes an elastomeric O-ring supported at its outer face by one or more washers, for example, a Teflon washer followed by a brass washer. The outer washer maybe held in place by a crimping of the housing around the outer washer.

The O-ring may fit within a counter bore in the housing and allows it to float in the manner of a hydraulic seal effectively preventing the escape of the thermally expansive wax.

The seal formed by the O-ring operates to reliably prevent leakage of the wax motor during initial operation. Over time with extended use, the O-ring may begin to wear at its interface with the piston shaft ultimately leading to leakage and failure of the wax motor.

SUMMARY OF THE INVENTION

The present inventors have determined that seal leakage that develops after extensive use of the wax motor is strongly dependent on the molding process used to produce the O-ring of the seal. In particular, O-rings molded so as to displace the molding flash away from the inner diameter of the O-ring that would normally be in contact with the piston provide extensively longer lifetimes. This is despite the fact that these specially molded o-rings and standard O-rings both seal acceptably for many thousands of initial cycles and any flash actually increases the material in the wear zone. This displacement of the flash may be accompanied by design is decreases the peak pressure of the contact region by providing a more uniform inner diameter.

Specifically then, the present invention provides a thermally responsive actuator having a housing having a bore extending along an axis and opening at a first end of the housing. A piston is slidable along the axis and has a shaft extendable through the opening of the housing with movement of the piston and a thermal expansion material is positioned within the bore in contact with the piston. A seal assembly is attached to the first end of the housing to cover the opening and surround a portion of the shaft to allow the shaft to slide through the seal while preventing the escape of the thermal expansion material. Importantly, the seal assembly includes an elastomeric seal surrounding a portion of the shaft and contacting the portion of the shaft at a contact region, the elastomeric seal having mold flash regions displaced from a center of the contact region.

It is thus a feature of at least one embodiment of the invention to increase the operating life of a wax motor or similar device by accommodating possible structural weakness in the mold flash regions and displacing them away from a center of the contact region with the shaft subject to the highest contact pressures for an O-ring. The standard molding process of the prior art results in flash at center of contact between the O-ring and shaft caused by a seam where the core and cavity sections of the O-ring mold meet. The flash is usually removed by tumbling or secondary operation or in handling. While the inventors do not wish to be bound by a particular theory, it is believed that the result of this flash removal is an area where there are negative and/or positive surface defects which are in the center of the sealing region of the o-ring.

The contact region of the elastomeric seal in a relaxed state may have a have a substantially constant cross-section.

It is thus a feature of at least one embodiment of the invention to increase the contact area between the elastomeric seal and the shaft without increasing distention of the elastomeric seal, the peak pressures of contact and thus wear forces, thereby decreasing wear rate.

The elastomeric seal may fit within a counter bore in the housing having a diameter larger than a relaxed diameter of the elastomeric seal.

It is thus a feature of at least one embodiment of the invention to provide increased seal life in a floating seal design.

The counter bore may be coaxially about a bore having a diameter extending substantially midway between a diameter of an outer periphery of the elastomeric seal and an inner periphery of the elastomeric seal as installed in the counter bore.

It is thus a feature of at least one embodiment of the invention to increase seal life in the design with minimized axial elastomeric seal compression.

The elastomeric seal may further include a gate mark removed from the contact region.

It is thus a feature of at least one embodiment of the invention to also accommodate possible structural weakness in the elastomeric seal near where an elastomer is introduced into the elastomeric seal mold.

The elastomeric seal may include witness marks in the mold flash regions removed from the contact region.

It is thus a feature of at least one embodiment of the invention to increase the wear life of an elastomeric seal even where there is no appreciable flash.

The elastomeric seal in a relaxed state may be a torus having a cross-section lying within a circle along a plane including the axis and wherein the mold flash regions are diametrically opposed across the circle at an angle to the axis.

It is thus a feature of at least one embodiment of the invention to shift the mold flash regions away from the contact region while preserving symmetry in the mold.

Alternatively, the elastomeric seal in a relaxed state is a torus may have a rectangular cross-section in a plane including the axis and wherein the mold flash regions are at corners of the rectangular cross-section.

It is thus a feature of at least one embodiment of the invention to shift the mold flash regions away from the contact region and to provide a large contact region of uniform pressure.

Alternatively, the elastomeric seal in a relaxed state may include a frustoconical portion.

It is thus a feature of at least one embodiment of the invention to provide a tapered seal where axial compression can be used to control radial seal compression.

Other features and advantages of the invention will become apparent to those skilled in the art upon review of the following detailed description, claims and drawings in which like numerals are used to designate like features.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Figure 1:
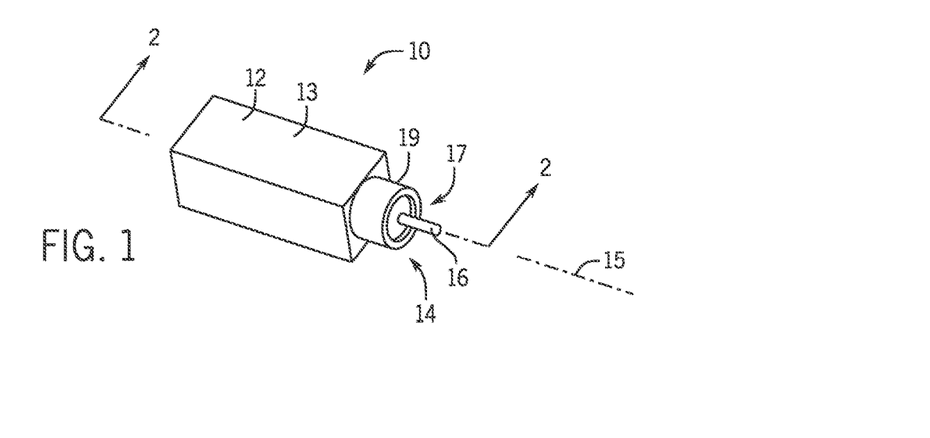
FIG. 1 is a perspective view of a wax motor suitable for use with the present invention showing the housing having an end that crimps about an opening through which the wax motor piston may extend.

Referring now to FIG. 1, a wax motor 10 may provide a metal housing 12, for example, having a rectangular body 13 and an opening 14 in one end through a machine cylindrical neck 19. A polished cylindrical shaft 16 may slidably extend along an axis 15 through a seal assembly 17. The shaft 16 may, for example, be a hardened stainless steel material.

Figure 2:
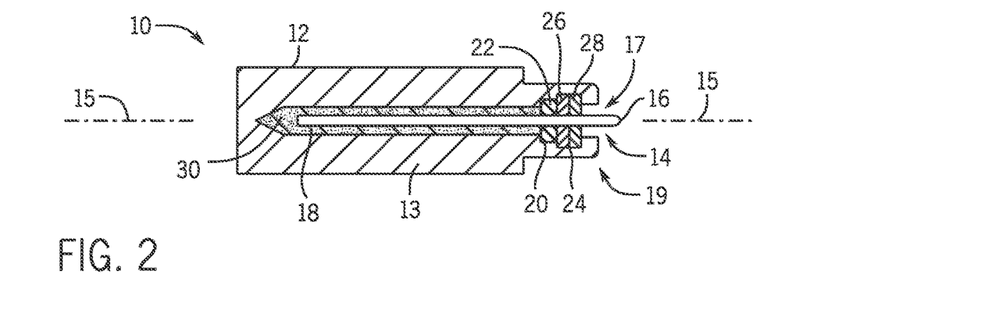
FIG. 2 is a cross-section taken along lines 2-2 of FIG. 1 showing receipt of the piston in a cavity within the housing holding wax, the latter end within the cavity by an O-ring followed by one or more washers, the last being held by the crimping of the housing.

Referring also to FIG. 2, the metal housing 12 may provide for blind bore 18 along axis 15 into which the shaft 16 extends. A first counter bore 20 at an end of the blind bore 18 near the opening 14 may hold an O-ring 22 positioned coaxially about the shaft 16 and constructed of a temperature resistant elastomer. A second counter bore 24 of larger diameter than the first counter bore 20 and closer to the opening 14 may hold a Teflon washer 26 and a brass washer 28 stacked concentrically about the shaft 16 so that the Teflon washer 26 is adjacent to the O-ring 22 and the brass washer 28 is positioned on an outer side of the Teflon washer 26. The Teflon washer 26 has an interference fit with the shaft 16 while the brass washer 28 is sized to have a sliding fit with the shaft within the intended operating temperature range of the wax motor 10.

A lip of the cylindrical neck 19 around the second counter bore is crimped radially inward about the outer face of the brass washer 28 to retain the brass washer 28 in position with slight compression of the Teflon washer 26 against a floor of the second counter bore 24 and minimal or no compression of the O-ring 22 between the Teflon washer 26 and a floor of the first counter bore 20.

A thermally expansive material 30, such as wax or another suitable material, is contained within the bore 18 surrounding the shaft 16.

Figure 3:
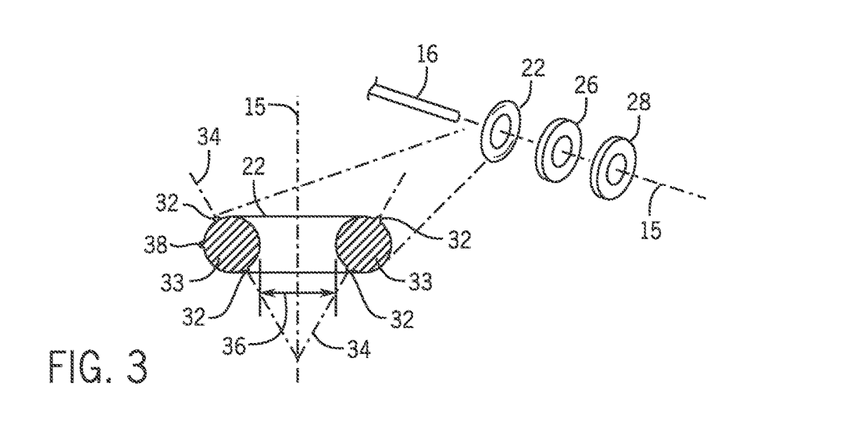
FIG. 3 is an exploded view of the piston, O-ring and washers showing a cross-sectional detail of the O-ring with bias-displaced mold flash.

Referring now to FIG. 3, the O-ring 22 may approximate a ring torus and be constructed of the elastomeric material having a radial symmetry about axis 15. Mold flash regions 32, being locations where elastomeric material may leak into the seam between mold portions, may be located in diametric opposition about the cross-sections 33 of the O-ring 22 in a plane perpendicular to the axis 15. In particular, the mold flash region 32 at each cross-section 33 of the O-ring 22 will define diameter lines 34 through the cross-sections 33 where the diameter lines 34 intersect the axis 15 at an angle, for example 45 degrees. When the mold flash region 32 is displaced along these canted diameter lines 34, the mold flash region 32 will be removed from the inner radius 36 of the O-ring 22 and thus away from contact with the shaft 16 passing through the O-ring 22. The invention contemplates that there may be no actual mold/at the mold flash regions 32 either because of mold precision or post-molding/-removal steps. Independent of the existence of mold flash, the O-ring 22 may exhibit "witness lines" caused by slight irregularities at the mold part lines. Such witness lines, may represent minor misalignment between mold portions or other discontinuities.

O-rings 22 of this characteristic have been determined to provide for sealing of the thermal expansion material 30 in a wax motor 10 for many more actuation cycles than conventional O-rings in which the mold flash regions are in contact with the shaft 16. This phenomenon does not appear to be related to the existence of the mold flash which arguably increases the material in the wear region and therefore might be expected to postpone wear and leakage. While the inventors do not wish to be bound to a particular theory, it is believed that displacement of the mold flash region may be independent of any mold flash but instead reflective of the microstructure of the O-ring 22 in the vicinity of a mold seam. Accordingly the invention is not limited to O-rings that actually exhibit mold flash.

The O-ring 22 may further have a gate mark 38 being excess elastomeric material from an attachment of the O-ring 22 to material of a feeding sprue during the molding process. The gate mark 38 may also be displaced away from the wear region, for example, to an outer diameter of the O-ring 22 away from contact with the shaft 16.

Figure 4:
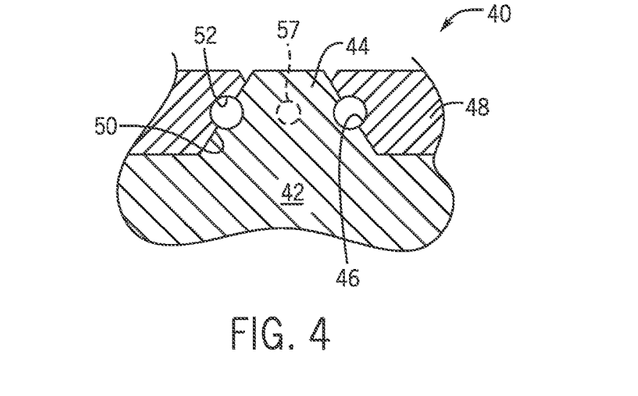
FIG. 4 is a fragmentary view of an example mold for fabricating the O-ring of FIG. 3.

Referring now to FIG. 4, O-rings of this type may be manufactured by a mold 40 having a bottom plate 42 with an upwardly extending frustoconical projection 44 that narrows with elevation. The projection 44 may have sidewalls formed at an angle, for example, of 45 degrees to the surface of plate 42 generally conforming to the desired diameter lines 34. Centered along this upward extension of the frustoconical projection 44, an annular groove 46 may circumscribe the frustrum so as to define one-half of the mold cavity having a toroidal cross-section. An upper plate 48 may have a frustroconical cavity 50 with the same general external dimensions as upwardly frustoconical projection 44 to mate therewith during the molding process. Machined into the surface of this cavity 50 is another groove 52 which mates with the groove 46 of projection 44 when the upper plate 48 and the bottom plate 42 are in the closed, seated relationship of FIG. 4.

Elastomeric material may be forced in molten form and at high pressure into the cavity formed by groove 46 and groove 52 (through a gate channel 57) intersecting the cavity in a radial direction from outside of the cavity. Methods of molding O-rings suitable for use in the present invention are described generally in U.S. Pat. No. 4,043,727 and in the Aug. 2, 1945 issue of American Machinists cited therein and hereby incorporated in its entirety by reference.

Figure 5:
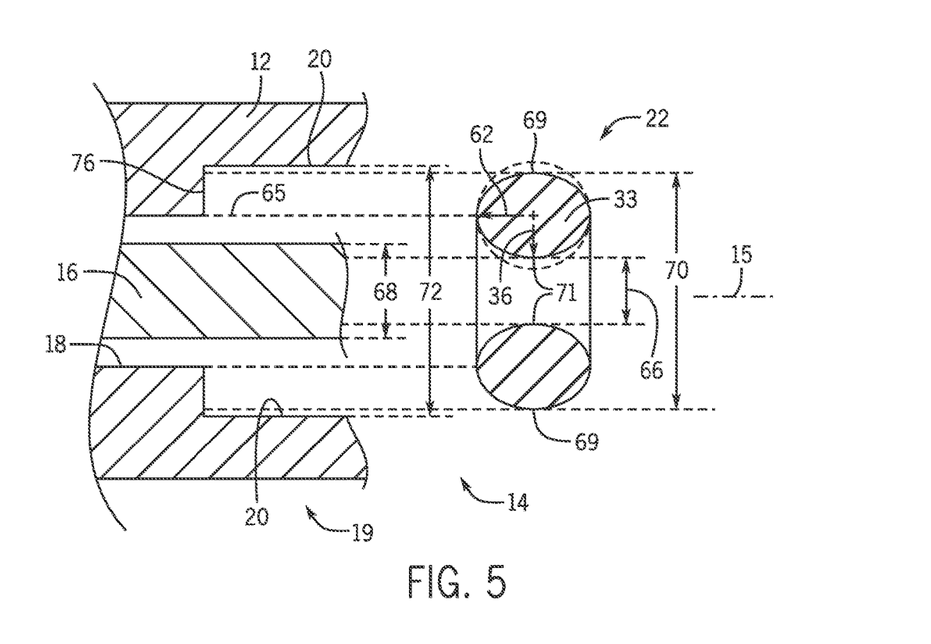
FIG. 5 is an exploded cross-sectional view of the O-ring of FIG. 3 and a portion of the wax motor housing and piston shaft in an alternative embodiment that also provides a flatter inner diameter of the O-ring.

Referring now to FIG. 5, the cross-section 33 of the O-ring 22 in its relaxed state before installation on the shaft 16 may have a flattened inner radius 36 diverging from a perfectly circular cross-section 60 having a radius 62. This form may be produced by proper shaping of the cavities described above with respect to FIG. 4. Specifically the inner radius 64 of the cross-section 33 of the O-ring 22 perpendicular to the axis 15 may be smaller than radius 62 of a circular cross-section 60, the smaller radius 64 hence producing a larger radius of curvature.

In the relaxed state, the O-ring 22 has an inside diameter 66 slightly smaller than the outside diameter 68 of the shaft 16 to seal tightly thereon. The outside diameter 70 of the O-ring 22 in the relaxed state, however, is slightly smaller than the internal diameter 72 of the counter bore 20 so that the O-ring 22 may essentially float with respect to the housing 12. A radial wall 76 between counter bore 20 and the blind bore 18 extends inward to a point 65 approximately midway between the radially outer periphery 69 of the O-ring 22 and its inner periphery 71 when placed on the shaft 16 to restrict axial motion of the O-ring 22 within the housing 12 in a direction away from the opening 14 with minimal compression in the axial direction on the O-ring 22.

Figure 6:
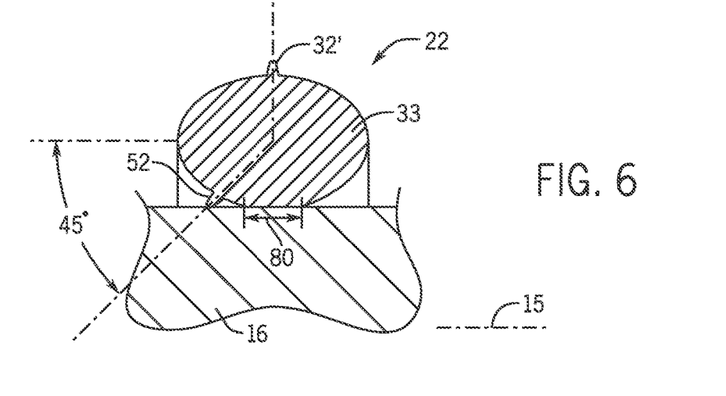
FIG. 6 is a Fig. similar to that of FIG. 3 showing an alternative design where the mold flash is displaced from the inner diameter region only.

Referring now to FIG. 6, it will be appreciated that when the O-ring 22 is installed on the shaft 16, it will contact the shaft 16 over a contact region 80 that will be increased with the flattened design shown in FIG. 5 without the need to increase the contact force between the O-ring 22 and the shaft 16 to elastically flatten the O-ring 22. This contact region 80 is of principal concern with respect to the displacement of inner mold flash region 32 which may be displaced along diameter line 34 angled with respect to axis 15 to be removed from the contact region 80 and its sealing interface against shaft 16. In contrast, outer mold flash region 32' may lie along the equatorial diameter line of the cross-section perpendicular to axis 15 being removed from the sealing interface of the inner radius 36. This irregular part line is possible because of the elasticity of the material of the O-ring 22 which could allow it to be removed from the mold in without typical mold relief.

Figure 7:
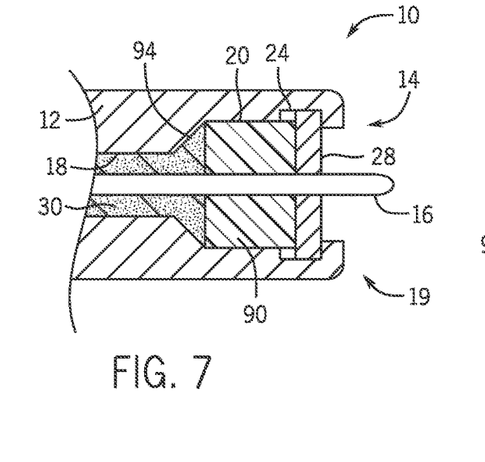
FIG. 7 is a fragmentary, cross-sectional view similar to FIG. 2 showing a cylindrical seal design providing mold flash displaced from the inner diameter region.
Figure 8:
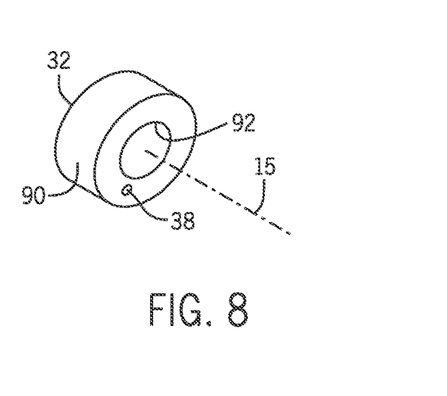
FIG. 8 is a perspective view of the cylindrical seal design of FIG. 7.

Referring now to FIGS. 7, and 8, the O-ring 22 of the wax motor 10 may be replaced with a cylindrical elastomeric seal 90 being generally a circular cylinder having a central, axial bore 92 of substantially constant circular cross-section when the cylindrical elastomeric seal 90 is in a relaxed state. The cylindrical elastomeric seal 90 may be constructed of the same materials as the O-ring 22 and may fit within the first counter bore 20, the latter extended slightly in axial length to accommodate a greater axial length of the elastomeric seal 90. In this case, the Teflon washer 26 may be omitted, with the inner surface of the brass washer 28 abutting the outer circular base of the cylindrical elastomeric seal 90. A tapered transition 94 may be made between the first counter bore 20 and the blind bore 18 to allow axial compression of the elastomeric seal 90 inward by the brass washer 28 such as increases a sealing force between elastomeric seal 90 and the shaft 16.

Figure 9:
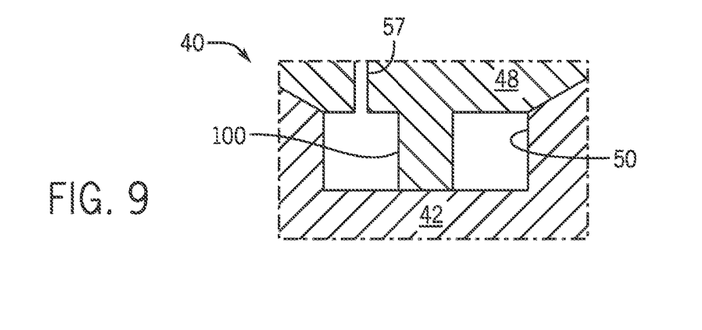
FIG. 9 is a figure similar to that of FIG. 4 showing a cavity design for molding the cylindrical seal of FIG. 7.

As with the O-ring 22, any witness lines caused by molten elastomeric material migrating into the part line of the mold during molding will be displaced from the center of the axial bore 92 to its edge. Referring to FIG. 9, as with the O-ring 22, the part line between a mold bottom plate 42 and a mold top plate 48 may be displaced away from the center of the contact region defined by a substantially cylindrical central mold pin 100 forming the axial bore 92. A gate channel 57 may enter the mold cavity at one circular face of the seal 90 (when molded) away from the contact region with the shaft 16 (when the cylindrical elastomeric seal 90 is assembled on the shaft 16)

Figure 10:
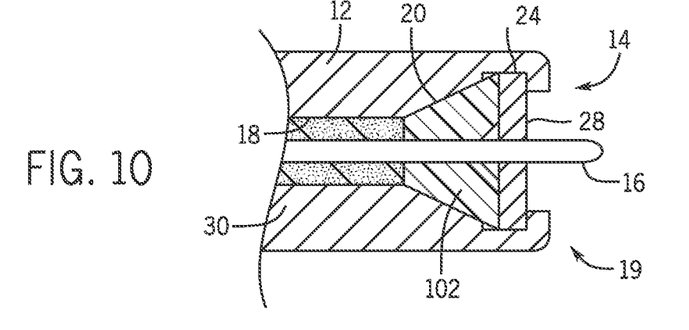
FIG. 10 is a figure similar to that of FIG. 7 showing a frustoconical seal design also having mold flash displaced from the inner diameter region.
Figure 11:
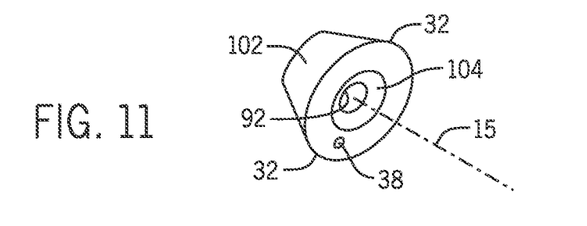
FIG. 11 is a figure similar to that of FIG. 8 for the frustoconical seal of FIG. 10.
Figure 12:
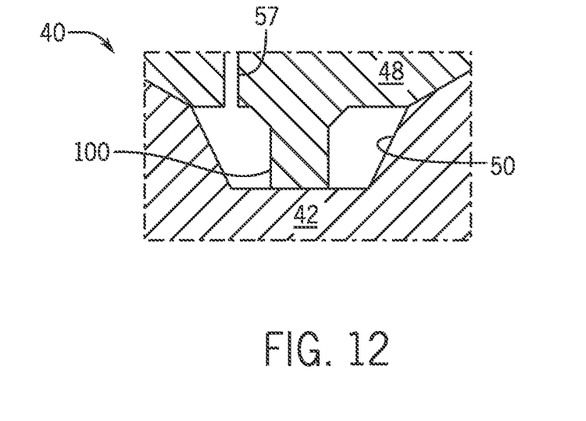
FIG. 12 is a figure similar to that of FIG. 9 showing a cavity design for the molding of the frustoconical seal of FIG. 10.

Referring now to FIGS. 10, 11, and 12, an alternative design provides a frustoconical seal 102 fitting within a corresponding frustoconical first counter bore 20 that tapers toward its connection with the blind bore 18. Compression by the brass washer 28 against the larger base of the frustoconical seal 102 provides increased compression of the frustoconical seal 102 over the contact region between the axial bore 92 and the shaft 16. A similar mold 40 as described with respect to FIG. 9, but where the central mold pin 100 includes an outer flair at one and forming a concave countersink 104 in the face of the seal 102 about the shaft 16 on the side which abuts the brass washer 28. As with the previous design, the contact region during the shaft 16 and the frustoconical seal 102 is spread over a larger constant cross-section central bore 92 (defined when the frustoconical seal 102 is in the relaxed state).

Figure 13:
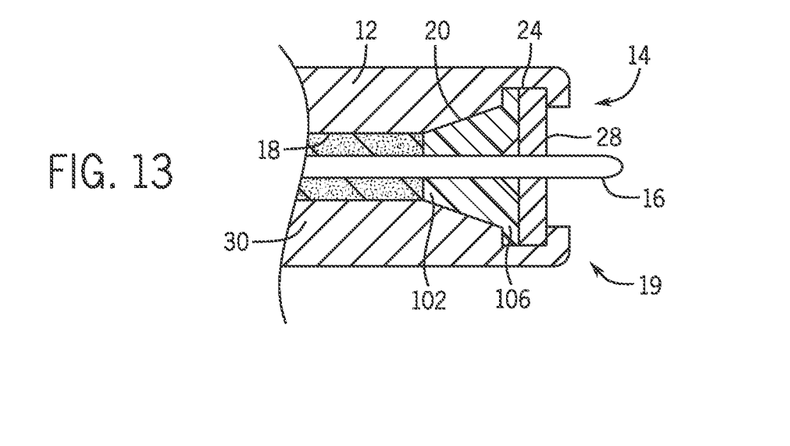
FIG. 13 is a figure similar to that of FIG. 7 showing a flanged, frustoconical seal also having mold flash displaced from the inner diameter region.
Figure 14:
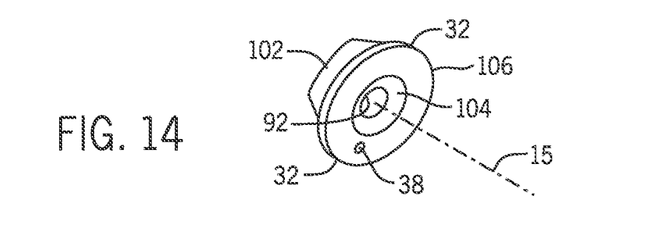
FIG. 14 is a figure similar to that of FIG. 8 for the flanged frustoconical seal of FIG. 13.
Figure 15:
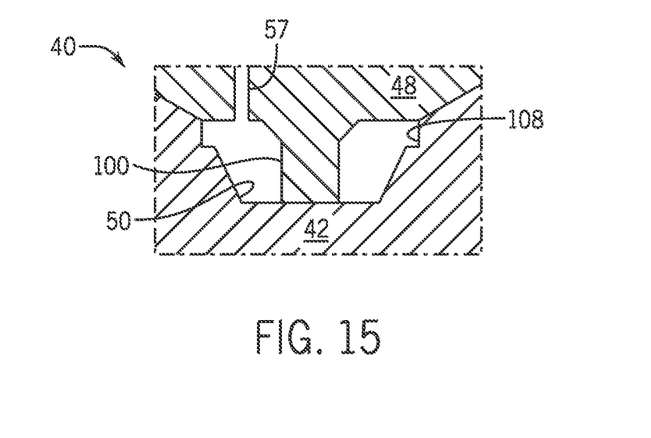
FIG. 15 is a figure similar to that of FIG. 9 showing a cavity design for molding the flanged frustoconical seal of FIG. 13

Referring now to FIGS. 13 and 14, the frustoconical seal 102 may have an integrally molded flange 106 attached at its outer face as abuts the brass washer 28. A rear face of this molded flange 106 abuts the radial wall separating the first counter bore 20 from the second counter bore 24 so that the molded flange 106 may be compressed between that wall and a rear face of the brass washer 98. Again axial compression tends to tighten the frustoconical portion 102 about the shaft 16 caused by the interaction of the frustoconical portion 102 with the conical first counter bore 20. Referring to FIG. 15, a mold similar to that shown and described with respect to FIG. 12 may be used for molding the frustoconical seal 102 with the integrally molded flange 106 by introducing a radially extending rim 108 to form that molded flange 106.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A thermally responsive actuator comprising:
   a housing having a bore extending along an axis and opening at a first end of the housing;
   a piston slidable along the axis and having a shaft extendable through the opening of the housing with movement of the piston;
   a thermal expansion material positioned within the bore in contact with the piston; and
   a seal assembly attached to the first end of the housing to cover the opening and surround a portion of the shaft to allow the shaft to slide through the seal assembly into contact with the thermal expansion material while preventing escape of the thermal expansion material;
   wherein the seal assembly includes an elastomeric seal surrounding a portion of the shaft and contacting the portion of the shaft over a contact region, the elastomeric seal having mold flash regions displaced from a center of the contact region; and
   wherein the elastomeric seal in a relaxed state is a toroid providing a bore extending along the axis, the bore having a constant circular cross-section when the elastomeric seal is in a relaxed state and wherein the mold flash regions are displaced outside of the bore.

2. The thermally responsive actuator of claim 1 wherein the elastomeric seal fits within a counter bore in the housing having a diameter larger than a relaxed diameter of the elastomeric seal.

3. The thermally responsive actuator of claim 2 wherein the counter bore is coaxially about a bore having a diameter extending substantially midway between a diameter of an outer periphery of the elastomeric seal and an inner periphery of the elastomeric seal as installed in the counter bore.

4. The thermally responsive actuator of claim 3 wherein the elastomeric seal further includes a gate mark removed from the contact region.

5. The thermally responsive actuator of claim 4 wherein the elastomeric seal includes witness marks in the mold flash regions removed from the contact region.

6. The thermally responsive actuator of claim 5 wherein the elastomeric seal in a relaxed state is a toroid having a rectangular cross-section in a plane including the axis and wherein the mold flash regions are at corners of the rectangular cross-section.

7. The thermally responsive actuator of claim 5 wherein the elastomeric seal in a relaxed state includes a frustoconical portion.

8. The thermally responsive actuator of claim 5 wherein the elastomeric seal in a relaxed state is a toroid having a circular cross-section along a plane including the axis and wherein the mold flash regions are displaced from diametric opposition across the circular cross-section.

9. A method of manufacturing a thermally responsive actuator of the type having:
   a housing having a bore extending along an axis and opening at a first end of the housing;
   a piston slidable along the axis and having a shaft extendable through the opening of the housing with movement of the piston;
   a thermal expansion material positioned within the bore in contact with the piston; and
   a seal assembly attached to the first end of the housing to cover the opening and surround a portion of the shaft to allow the shaft to slide through the seal into contact with the thermal expansion material while preventing escape of the thermal expansion material;
   wherein the seal includes an elastomeric seal surrounding a portion of the shaft and contacting the portion of the shaft at a contact region, wherein the elastomeric seal in a relaxed state is a toroid providing a bore extending along the axis, the bore having a constant circular cross-section when the elastomeric seal is in a relaxed state and wherein the mold flash regions are displaced outside of the bore, comprising the steps of:
   (a) molding an elastomeric seal out of an elastomeric material using a mold having a part line between mold components defining a mold flash region on the elastomeric seal displaced from an inner periphery of the elastomeric seal;
   (b) installing the elastomeric seal on the shaft so that the mold flash regions are displaced from a center of the contact region; and
   (c) sealing the housing about the elastomeric seal.

10. The method of claim 9 wherein step (a) molds the elastomeric seal so that the contact region of the elastomeric seal in a relaxed state has a substantially constant cross-section.

11. The method of claim 10 wherein the elastomeric seal fits within a counter bore in the housing having a diameter larger than a relaxed diameter of the elastomeric seal.

12. The method of claim 11 wherein the counter bore is coaxially about a bore having a diameter extending substantially midway between a diameter of an outer periphery of the elastomeric seal and an inner periphery of the elastomeric seal as installed in the counter bore.

13. The method of claim 12 wherein the elastomeric seal further includes a gate mark removed from the contact region.

14. The method of claim 13 wherein the elastomeric seal in a relaxed state is a toroid having a circular cross-section along a plane including the axis and wherein the mold flash regions are displaced from diametric opposition across the circular cross-section.

15. The method of claim 13 wherein the elastomeric seal in a relaxed state is a toroid having a rectangular cross-section in a plane including the axis and wherein the mold flash regions are at corners of the rectangular cross-section.

16. The method of claim 13 wherein the elastomeric seal in a relaxed state includes a frustoconical portion.

* * * * *